3,177,168
HIGH IMPACT POLYSTYRENE
Hans E. Lunk, Oakland, and Marshall E. Doyle, Alameda, Calif., assignors to Shell Oil Company, New York, N.Y., a corporation of Delaware
No Drawing. Filed Jan. 25, 1960, Ser. No. 4,183
2 Claims. (Cl. 260—28.5)

The present invention relates to molding compositions comprising polyvinyl aromatic compounds. More particularly, this invention relates to a high impact polystyrene molding composition.

It is known that polyvinyl aromatic compounds such as polystyrene have improved properties of toughness when a small amount of rubbery polymer is incorporated therewith. It is also known that in order to mold thermoplastic compositions such as polystyrene it is necessary to employ agents to improve the moldability of the compositions. Thus, it is important to include a lubricant with the composition in order to give the desired properties of flow, prevent sticking to the mold, and the like. However, the use of a lubricant, even in relatively small amounts has a marked effect on the strength properties of polyvinyl aromatic materials such as polystyrene.

It is a primary object of this invention to provide a lubricant for polyvinyl aromatic molding compositions which provides the desired flow properties. Another object of this invention is to provide a lubricant for polyvinyl aromatic compositions which provides the desired toughness and yet which is comparatively inexpensive.

These and other objects are accomplished by incorporating a lubricant in polyvinyl aromatic molding compositions, which lubricant comprises from about 1.5 to about 3.5 parts by weight of a paraffin wax and from 0.5 to about 2.5 parts by weight of a member of the group consisting of hydrocarbon oil and a highly naphthenic wax.

In its broad aspect, the present invention embraces molding compositions of vinyl aromatic resins which are solid polymers and copolymers of vinyl aromatic compounds having the vinyl group attached to a carbon atom of the aromatic nucleus substituted with one or more groups such as methyl, ethyl and chloro groups. However the preferred polyvinyl aromatic resins utilize styrene as the vinyl aromatic constituent. In addition to the vinyl aromatic constituent, the molding compositions of the present invention may also contain a rubbery polymer in order to improve the properties of toughness. Such rubbery polymers contain a major portion of the polymerization product of conjugated diolefins and a minor proportion of styrene. Examples of such rubber polymers include polybutadiene, polyisoprene, copolymers of butadiene and styrene and copolymers of butadiene and acrylonitrile. The preferred polymers suitable for this invention consist essentially of styrene and butadiene components.

The relative proportions of polyvinyl aromatic material and rubbery polymer should be within the range of from about 85 to 98 parts by weight of polyvinyl aromatic materials and from about 2 to about 15 parts by weight of rubbery polymer.

The lubricant used in the present invention consists essentially of about 1.5 to about 3.5 parts by weight of a paraffin wax and from 0.5 to about 2.5 parts by weight of a member of the class consisting of a hydrocarbon oil and a highly naphthenic wax. The amount of lubricant used will vary with the particular resin and the properties desired, but it will generally be within the range of from about 1 to about 6 parts by weight of lubricant per 100 parts by weight of resin. The lubricant is preferably substantially free of olefinic and aromatic constituents. The blend of paraffin wax and hydrocarbon oil or highly naphthenic wax is required in the present invention in order to obtain the desired balance of properties. Thus, paraffin wax generally provides rather high impact strength but it also generally gives insufficient elongation and sometimes insufficient flow. The hydrocarbon oils and highly naphthenic waxes used in the present invention, on the other hand, provide the desired properties of elongation and flow, but do not provide a sufficiently high yield strength.

It has now been found that by utilizing the paraffin waxes of comparatively low molecular weights, as waxes go, it is possible to eliminate the problem of insufficient flow, and by blending hydrocarbon oil with such a paraffin wax, it is possible to provide the desired elongation. Higher molecular weight hydrocarbons seem to increase the flow temperature (Rossi-Peakes) and the hydrocarbons having more than 30 carbon atoms should be held to a minimum. Thus it is preferable to use hydrocarbons which are normal or substantially normal and for best results the hydrocarbon wax should have above about 60% normal paraffins. The term n-paraffin means a straight chain alkane with no branching whatever.

The hydrocarbon oil may be any of those known in the trade as white mineral oils. Such mineral oils consist principally of saturated aliphatic hydrocarbons and those applicable to the present invention have a boiling point between about 400 and 1,000° F. and preferably have a gravity of above 30° API at 60° F.

As mentioned above, such materials provide excellent elongation and fairly good flow temperatures, but are unsatisfactory by themselves because they seriously reduce the yeld strength which is otherwise attainable. A typical example of a preferred mineral oil hereinafter referred to as Mineral Oil A has a gravity of 32.5° API, a pour point of −15, a viscosity (Universal Saybolt seconds at 100° F.) of 104 and an initial boiling point of 584° F.

The paraffin wax used in the preparation of the lubricant of the present invention is obtained from the crude wax product which is obtained when lubricating oils having paraffin wax are dewaxed according to conventional refinery techniques. Examples of paraffin waxes which may be used in the present invention are illustrated as the procedures given below:

*Paraffin wax A.*—A light lube oil fraction is obtained by a vacuum distillation of that portion of a crude which remains after the light fractions have been removed, by atmospheric distillation. This light oil is treated to remove aromatics in a conventional phenol extractor, and the raffinate from the extractor is dewaxed in a dewaxing unit using methyl ethyl ketone as the solvent. In the dewaxing unit, the raffinate and solvent is filtered at a low temperature to remove the solidified crude wax from the liquid oil. The crude wax thus obtained is sent to a wax deoiling unit where the wax is melted again in the presence of solvent and cooled only to an amount sufficient that the high melting wax components crystallize. The raw wax from the wax deoiling unit is usually sent to a *finishing* unit where certain impurities present in minute amounts are removed to provide a marketable finished wax.

The wax thus obtained from the light fractions will generally contain about 90% normal paraffins depending on the type of crude oil which entered the refinery in the first phase. However, analysis of various light fractions of West Texas crudes show that for waxes thus obtained which have a melting point of from 121–125° F., the usual range is from about 80 to about 97% normal alkanes, the branched or isoalkanes are usually from about 2 to 20% and generally from about 2 to 10% by volume, and the naphthenic or cycloalkanes will be less than 5% and usually less than 2%. Aromatic materials are present only in trace amounts, and olefinic materials are not found by analysis.

*Paraffin wax B.*—After the light lubricating oil fraction is obtained as mentioned in the procedure above for paraffin wax A, a medium lubricating oil is obtained by further distillation at subatmospheric pressure to provide a medium lube oil. This oil is dewaxed and the wax treated as mentioned above to provide a finished wax from the medium distillate lubricating oil. This wax contains components having a somewhat higher molecular weight than the wax obtained from the light fraction because of the higher boiling points involved, and generally will contain less normal alkanes and more branched and cyclic alkanes. A typical wax fraction thus obtained which has a melting point from about 138 to 140° F. contains from about 70 to 80% normal alkanes, from about 8 to 20% isoalkanes and from about 6 to about 15% cycloalkanes.

*Paraffin wax C.*—57 parts of paraffin wax B and 43 parts of paraffin wax A were blended together to form a homogeneous mixture. The resulting wax has a melting point of about 132 to 134° F.

The above waxes were used as lubricants in preparing a bulk interpolymer of styrene and a styrene-butadiene copolymer in accordance with the procedure which will be given hereinafter. In addition to these materials, waxes having considerably higher molecular weights were also tested. These high molecular weight waxes may be labeled as paraffin wax D which has a melting point of 158–162° F. and contains a much higher percentage of isoalkane and naphthenes than paraffin waxes A through C. In addition the molecular weights were much higher, and the average number of carbon atoms was above 30 and probably of the order of, say, 33. Paraffin wax E is obtained by urea extraction of the waxy portion from still bottoms and therefore is substantially free of naphthenic constituents. It has a melting point of about 180° F. and has an average number of carbon atoms of the order of, say, about 40 carbons.

Table I below gives the effect of these lubricants and certain of the physical properties of the bulk polymer containing 4 parts of wax per 100 parts of resin. The resin consisted of a solution of 5% S–1006 (a "hot" rubber containing 77% butadiene and 23% styrene) in styrene. The wax was added to the solution (4 parts wax per 100 parts solution) and the mixture was polymerized by heating the solution to 95° C. for 10 hours with stirring followed by the following periods of heating without further agitation:

4 hours at 110° C.
4 hours at 125° C.
3 hours at 145° C.
12 hours at 180° C.

The polymer was then given 5 minutes of milling at 170° C. on a 6-inch, 2-inch rubber mill with differential roll speeds. Specimens were compression-molded and tested for the properties listed in Table I below.

TABLE I

| Wax | Elong., percent | Heat Dist. Temp., °C. | Rossi-Peakes Flow Temp., °C. |
|---|---|---|---|
| A | 22 | 67.5 | 124 |
| B | 24 | 68 | 126 |
| C | 23 | 67 | 124 |
| D | 27 | 71 | 130 |
| E | 22 | 75 | 134 |

All of the paraffin waxes give fairly good impact strength and high yield strengths but it is seen from the table that the high molecular weight waxes appear to provide insufficient flow. In addition, all of the paraffin waxes shown above except that which contains a fairly good percentage of naphthenic composition gave insufficient elongation. Thus none of the paraffin waxes are suitable by themselves even though they give excellent impact resistance and yield strength.

In accordance with the present invention, a blend of the low molecular weight paraffin waxes with oils or soft waxes (highly naphthenic waxes), provides the desired elongation and yet retains a good yield strength and high impact. The components of the blend may generally vary from about 37½% to about 87½% by weight of paraffin wax with the remainder being a hydrocarbon oil or a soft wax.

In order to better illustrate the invention, the following examples are given:

*Example I*

A high impact molding composition was prepared by forming a solution of 5% by weight of S–1006 rubber in styrene. The S–1006 is a "hot" rubber containing 77% butadiene and 23% styrene. To 96 parts by weight of this was added 1 part of mineral oil A and 3 parts of paraffin wax C. The mixture is then subjected to the conditions set forth to form a polymer.

10 hours at 95° C. with stirring
4 hours at 110° C. without stirring
4 hours at 125° C. without stirring
3 hours at 145° C. without stirring
12 hours at 180° C. without stirring The resulting polymer was milled on a two-roll mill with differential roll speeds at 170° C. for five minutes and molded into test bars. The properties are shown in Table II below. Another run was made according to procedure given above except that the lubricant consisted of 2 parts of mineral oil A and 2 parts of paraffin wax C. The results of this run are also given in Table II below. Similarly, runs were made using 4 parts of paraffin wax C and 4 parts of mineral oil A for the sake of comparison, and the results of these two runs are also given in Table II below.

TABLE II

| Lubricant | Tensile, p.s.i. | Yield, p.s.i. | Elong., percent | Hardness Rockwell, "M" | Heat Dist., °C. | Flow, °C. | Impact Izod Notched, ft. lbs./in. |
|---|---|---|---|---|---|---|---|
| Paraffin Wax C | 3,060 | 2,800 | 21 | 30 | 68 | 123 | 0.88 |
| 3 parts paraffin wax C—1 part mineral oil A | 2,700 | 2,800 | 28 | 38 | 67.5 | 125 | 1.09 |
| 2 parts paraffin wax C—2 parts mineral oil A | 2,500 | 2,700 | 29 | 38 | 69 | | .96 |
| 4 parts mineral oil A | 2,300 | 2,100 | 31 | 34 | 71 | 129 | .93 |

From the table, it is seen that the mixture of wax and oil gives an excellent balance of properties while either one alone is unsatisfactory. The results are particularly good when the proportions are of the order of 3 parts by weight of paraffin wax to 1 part by weight of mineral oil although good results are obtained when the proportions lie in the range from about 1.5 to 3.5 parts paraffin wax to a sufficient amount of oil to bring the sum to 4 parts.

*Example II*

The procedure of Example I was repeated except that mineral oil A was replaced by a different oil in one set of runs and by a soft wax in another run. The oil and soft wax are obtained from the medium lubricating oil fraction described under the procedure for paraffin wax B above. This medium lubricating oil is the fraction distilling at 250° F. at reduced pressures. A high viscosity index oil taken from this fraction is used in this example and is designated as HVI Split oil. The soft wax is obtained when the crude wax has been treated to remove paraffin wax B. The hydrocarbon oil will contain considerable branching and naphthenic groups and so will the wax. An analysis of a typical soft wax is 17.6% n-paraffin, 39.4% isoparaffins, 29.0% mononaphthenes, 3.7% dinaphthenes and 4.1% aromatics of which 1.4% are naphthenes. Thus the wax might be characterized as a highly naphthenic wax. The results obtained with these lubricants are shown in Table III below:

TABLE III

| Lubricant | Yield strength, p.s.i. | Elong., percent | Hardness Rockwell, "M" | Heat Dist. Temp., °C. | Rossi-Peakes Flow Temp., °C. | Impact Izod |
|---|---|---|---|---|---|---|
| 3 parts paraffin wax C— 1 part soft wax | 2,500 | 26.5 | 33 | 67 | 126 | 1.04 |
| 3 parts paraffin wax C— 1 part HVI split oil | 2,800 | 27 | 27 | | 126 | 1.1 |
| 2 parts paraffin wax C— 2 parts HVI split oil | 2,900 | 29 | | | 126 | |
| 4 parts HVI split oil | 2,150 | 33.5 | | | 128 | |

From the above data, it is seen that improved properties are also obtained when a highly branched and high naphthenic oil or wax is blended with a paraffin wax which is high in normal alkanes.

We claim as our invention:
1. A high impact polystyrene molding composition comprising from about 85 to about 98 parts by weight of polymerized styrene, from about 2 to about 15 parts by weight of a rubber polymer, and from about 1 to about 6 parts by weight of a lubricant, said lubricant comprising from 0.5 to about 2.5 parts by weight of a hydrocarbon oil and from about 1.5 to about 3.5 parts by weight of a paraffin wax which consists substantially only of alkanes and naphthenes, and which has a melting point between 40° and 70° C.
2. The molding composition of claim 1, in which said rubber polymer is a butadiene-styrene copolymer and said wax contains above about 60% normal alkanes.

References Cited by the Examiner
UNITED STATES PATENTS

| 2,382,498 | 8/45 | Morley | 260—28.5 |
| 2,808,386 | 10/57 | D'Alelio | 250—28.5 |
| 2,844,562 | 7/58 | Ingram | 260—45.5 |
| 2,967,817 | 1/61 | Marple et al. | 260—28.5 |

MORRIS LIEBMAN, *Primary Examiner.*

ALLAN M. BOETTCHER, MILTON STERMAN, ALEXANDER H. BRODMERKEL, *Examiners.*